(12) United States Patent
Irwin et al.

(10) Patent No.: US 8,058,359 B2
(45) Date of Patent: Nov. 15, 2011

(54) VARNISH COMPOSITIONS FOR ELECTRICAL INSULATION AND METHOD OF USING THE SAME

(75) Inventors: Patricia Chapman Irwin, Clifton Park, NY (US); Qiwei Lu, Seven Hills, OH (US); Michael J. O'Brien, Clifton Park, NY (US)

(73) Assignee: Sabic Innovative Plastics IP B.V. (NL)

( * ) Notice: Subject to any disclaimer, the term of this patent is extended or adjusted under 35 U.S.C. 154(b) by 535 days.

(21) Appl. No.: 12/267,663

(22) Filed: Nov. 10, 2008

(65) Prior Publication Data

US 2010/0119716 A1   May 13, 2010

(51) Int. Cl.
  *C08L 71/12* (2006.01)
  *C08G 65/38* (2006.01)
  *C08G 65/48* (2006.01)

(52) U.S. Cl. ........ 525/391; 525/392; 528/495; 528/496; 528/497; 528/498

(58) Field of Classification Search ................ 525/391, 525/392; 528/495, 496, 497, 498
See application file for complete search history.

(56) References Cited

U.S. PATENT DOCUMENTS

| | | | |
|---|---|---|---|
| 3,210,384 A | 10/1965 | Hay | |
| 3,306,875 A | 2/1967 | Hay | |
| 3,367,978 A | 2/1968 | White | |
| 3,496,236 A | 2/1970 | Cooper et al. | |
| 4,234,706 A | 11/1980 | White | |
| 4,521,584 A | 6/1985 | Heitz et al. | |
| 5,213,886 A | 5/1993 | Chao et al. | |
| 5,880,221 A | 3/1999 | Liska et al. | |
| 6,403,229 B2 | 6/2002 | Yeager et al. | |
| 6,455,663 B1 | 9/2002 | Braat et al. | |
| 6,558,783 B1 | 5/2003 | Kato et al. | |
| 6,569,982 B2 | 5/2003 | Hwang et al. | |
| 6,835,786 B2 | 12/2004 | Ishii et al. | |
| 6,897,282 B2 | 5/2005 | Freshour et al. | |
| 6,995,195 B2 | 2/2006 | Ishii et al. | |
| 7,329,708 B2 | 2/2008 | Birsak et al. | |
| 7,858,726 B2 * | 12/2010 | Onizuka et al. | 528/88 |
| 2007/0066710 A1 | 3/2007 | Peters et al. | |

FOREIGN PATENT DOCUMENTS

WO   2000046272 A1   8/2000

* cited by examiner

*Primary Examiner* — Michael J Feely
(74) *Attorney, Agent, or Firm* — Cantor Colburn LLP

(57) ABSTRACT

A process for preparing a redistributed poly(phenylene ether), comprising reacting a poly(phenylene ether) in a reactive diluent monomer with a polyhydric phenol in the presence of a redistribution catalyst to form a composition comprising a redistributed poly(phenylene ether) in the reactive monomer diluent. The redistributed poly(phenylene ether) exhibits an intrinsic viscosity in the range of about 0.06 deciliters per gram to about 0.25 deciliters per gram, measured in chloroform at 25° C. The redistributed poly(phenylene ether) can be functionalized and admixed with unsaturated resin such as an unsaturated polyester resin or vinyl ester resin to obtain a varnish composition that, when cured, can form an electrically insulative thermoset.

38 Claims, No Drawings

VARNISH COMPOSITIONS FOR ELECTRICAL INSULATION AND METHOD OF USING THE SAME

FIELD OF THE INVENTION

The present invention is directed to a process for preparing a composition comprising a redistributed poly(phenylene ether), in a reactive monomer diluent, through reaction with a polyhydric phenolic compound in the presence of a redistribution catalyst. The invention also relates to the use of a varnish composition, made by the process, for insulating electrical machinery.

BACKGROUND OF THE INVENTION

Although the stator windings of electrical inductive devices, such as motors, are wound with magnet wire having enamel or other insulative coating thereon, it is often desirable to further coat the windings and seal them from the environment. For example, protection of the stator windings by an additional coating is desirable in blower motors utilized in cooling systems for locomotive traction motors. Protection is also desirable in open motors utilized in driving pumps in oil field applications, which are exposed directly to blowing sand and dirt as well as moisture.

Conventional curable varnish compositions, such as those used in certain locomotive traction motors, are so-called "solventless" varnishes based on unsaturated polyester resin (UPR). These varnish systems, however, have a glass transition temperature (Tg) significantly below 80° C. Thus, their performance at motor operating temperatures, usually about 160° C., can result in significant thermal degradation after extended operating times. In addition, such varnishes tend to chip or crack, particularly when subjected to vibrations accompanying locomotive operation. Such UPR varnishes also have a high moisture absorption rate and their ester bonds are hydrolysable, which can result in more frequent maintenance intervals than desired.

What is needed is a varnish composition that can better withstand higher temperature and a method for electrically insulating electrical devices with the varnish composition. Polyphenylene ether resins (hereinafter "PPE") are commercially attractive materials because of their unique combination of physical, chemical, and electrical properties. Furthermore, the combination of PPE with other resins can provide blends that result in additional overall properties such as chemical resistance, high strength, and high flow. However, the use of PPE, especially of low intrinsic viscosity, is relatively expensive for use in a varnish composition.

One method of making a PPE of low intrinsic viscosity is by the redistribution of the PPE by reaction with a phenolic compound. For example, UK 1 119 914 describes the redistribution of poly(phenylene ether) with phenolic compounds, designating the redistribution by the term equilibration. In the redistribution reaction, poly(phenylene ether) is dissolved in a solvent with a phenolic compound and a promoter and heated at elevated temperatures. The poly(phenylene ether) polymer is split into shorter units, wherein the phenolic compound is incorporated into the poly(phenylene ether).

More recently, redistribution of poly(phenylene ethers) employing certain classes of phenolic compounds to obtain oligomers, using toluene or a blend of toluene and an alcohol as solvent, was disclosed in U.S. Pat. No. 5,880,221. After redistribution, the poly(phenylene ether) was isolated by precipitation or evaporation of a solvent mixture.

It would be desirable to develop a commercially attractive process for preparing a varnish composition comprising PPE. It should be apparent that each process step and associated mechanical equipment such as reaction vessels used in preparing the PPE and the varnish composition are a significant consideration in determining the commercial feasibility of using PPE in a varnish composition.

SUMMARY OF THE INVENTION

It has now been found that a varnish composition can be prepared, in an extremely advantageous manner, by a process comprising reacting a poly(phenylene ether), in a reactive monomer diluent, with a polyhydric phenol in the presence of a redistribution catalyst to form a composition comprising a redistributed poly(phenylene ether) and the reactive monomer diluent.

Also disclosed is a method for electrically insulating a motor using a varnish composition made using the process described above, comprising providing a component of a motor, applying the varnish composition to the motor component, and curing the varnish composition to form an electrically insulative thermoset coating over the motor component.

Other features of the present invention will be apparent from the following more detailed description of exemplary embodiments.

DETAILED DESCRIPTION OF EXEMPLARY EMBODIMENTS

The process for preparing a redistributed poly(phenylene ether), in a reactive monomer diluent, according to the present process can be used to form a composition comprising redistributed poly(phenylene ether) in which the redistributed poly(phenylene ether) has a lower intrinsic viscosity. This lower intrinsic viscosity is associated with a lower weight average molecular weight and a higher hydroxy functionality than the starting poly(phenylene ether).

In one embodiment, the intrinsic viscosity of the poly(phenylene ether), before the redistribution reaction, is 0.12 to 4.0, specifically 0.12 to 0.35, deciliter per gram and the intrinsic viscosity of the redistributed poly(phenylene ether), after the redistribution reaction, is 0.06 to 0.25, specifically 0.09 to 0.15, deciliter per gram, measured in chloroform at 25° C. The change in the intrinsic viscosity of the redistributed poly(phenylene ether) can be 0.01 to 0.35, specifically 0.02 to 0.1, decimeter per gram lower than the intrinsic viscosity of said poly(phenylene ether) before reaction, measured in chloroform at 25° C. The intrinsic viscosity and the hydroxy functionality of the poly(phenylene ether) refers to properties of the polymer after it is isolated from the composition containing the reactive monomer diluent, for example, isolated by use of an anti-solvent, since other components or impurities present in the composition produced by the process can affect the measured values.

Related to the change in intrinsic viscosity, the weight average molecular weight of the poly(phenylene ether) before reaction can be 5000 to 50000 g/mol, specifically 6000 to 30000 g/mol, and the weight average molecular weight of the redistributed poly(phenylene ether) can be 1000 to 10000 g/mol, specifically 1600 to 6000 g/mol. Similarly, the weight average molecular weight of the redistributed poly(phenylene ether) can be reduced in value by 10 to 90 percent, specifically 20 to 60 percent, relative to the weight average molecular weight of the poly(phenylene ether) before reaction.

The redistribution reaction, in addition to decreasing the intrinsic viscosity of the poly(phenylene ether), can provide the additional benefit of increasing the hydroxy functionality of the poly(phenylene ether). In one embodiment, before reaction, the hydroxy functionally on average is about 1, and the hydroxy functionality of the redistributed poly(phenylene ether) is on average greater than about 1, specifically about 2 to 4. As used herein, the hydroxy functionality (or later functionality with respect to unsaturated groups) refers to an average value that is approximated to the nearest whole number. The functionality, either hydroxy or later unsaturation, can be measured using nuclear magnetic resonance (NMR) or, in the case of hydroxy content, also by Fourier Transfer Infra-Red Analysis (FTIR).

The redistribution reaction can be carried out in a reactive monomer diluent that is an alkenyl aromatic monomer. Reactive monomer diluents, for example, can be selected from styrene, α-methyl styrene, 2-methylstyrene, 3-methylstyrene, 4-methyl styrene (para-methyl styrene), 2-t-butylstyrene, 3-t-butyl styrene, 4-t-butylstyrene, styrenes having from 1 to 5 halogen substituents on the aromatic ring, vinyl naphthalene, and combinations thereof. In one embodiment, the reactive monomer diluent is selected from the group consisting of vinyl toluene, styrene, butyl styrenes, dibromostyrenes, α-methyl styrene, p-methyl styrene, and combinations thereof. Alkyl groups on styrene are optionally substituted with one or more halogens.

In one embodiment, the reaction mixture comprises 20 to 60 wt. % of poly(phenylene ether) and at least 25 wt. %, specifically 36 to 79 wt. %, of reactive monomer diluent, based on total composition. Other organic solvents or additives can be present. However, at least 40 wt. %, specifically at least 50 wt. % of the organic solvent during the redistribution reaction can be one or more compounds that serve as a reactive monomer diluent. By the term "reactive monomer diluent" is meant any reactive monomer that is in liquid form and is curable with at least poly(phenylene ether) to form a thermoset. In one embodiment, substantially no organic solvent other than reactive monomer diluent is present during the redistribution reaction. Thus, a "solventless" or substantially solventless solution can be used. By the term "substantially" is meant less than 40 wt. %, specifically less than 20 wt/%, more specifically less than 10 wt. %, most specifically about zero wt. % of the organic solvent is other than reactive monomer diluent. The term "organic solvent" is defined as an organic compound that is a liquid at room temperature and in which the poly(phenylene ether) is essentially soluble at the concentration used in the composition.

In the redistribution reaction, the molecular weight of the poly(phenylene ether) which reacts with the polyhydric phenolic compound is decreased in proportion to the degree of reaction with the polyhydric phenolic compound. The polyhydric phenolic compound can be incorporated into the polymer product as the terminal phenoxy group, or tail unit, of the molecule, with the balance of the molecule being one or more phenoxy units that are the repeating unit of the starting poly(phenylene ether) with the terminal or head unit having a hydroxyl group in place of the ether oxygen of the other units. To some extent, in addition to the terminal units, the polyhydric phenolic compound can also be incorporated internally into the polymer backbone, also in a non-extractable form, although usually to a lesser extent. Various theoretical mechanisms have been postulated for a quinone-coupling reaction, for example, in column 3 of U.S. Pat. No. 4,234,706. Without wishing to be bound by theory, it is believed that a similar reaction results when using a polyhydric phenolic compound in which a redistribution catalyst is used to remove the phenolic hydrogen to form a phenoxy radical that reacts with the polymer instead of the quinone.

The polyhydric phenolic compound (or "phenol compound" in context) can comprise two to four hydroxy-phenyl groups attached to a $C_1$-$C_{16}$ hydrocarbyl moiety. In one embodiment, the polyhydric phenolic compound is a bisphenol having the formula

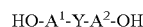

wherein $A^1$ and $A^2$ are independently a monocyclic divalent $C^6$-$C^{16}$ aromatic radical, and Y is a single bond, an oxygen, or a $C_1$-$C_{16}$ bridging radical in which one or two atoms separate $A^1$ from $A^2$. The O-$A^1$ and $A^2$-O bonds are usually in the meta or para positions of $A^1$ and $A^2$ in relation to Y.

In one embodiment, the $A^1$ and $A^2$ are unsubstituted phenylene or substituted phenylene wherein substituents are $C_1$-$C_4$ hydrocarbyl groups (for example, alkyl), nitro, alkoxy, and the like. Specifically, $A^1$ and $A^2$ can be unsubstituted phenylene radicals. Each of $A^1$ and $A^2$ can, for example, be o-phenylene and/or m-phenylene, specifically both p-phenylene.

The Y group can, for example, be a hydrocarbon radical and specifically a saturated radical such as methylene, cyclohexylmethylene, ethylene, isopropylidene, neopentylidene, cyclohexylidene or cyclopentadecylidene, especially a gem-alkylene (alkylidene) radical and most specifically isopropylidene. Also included, however, are radicals that contain atoms other than carbon and hydrogen; for example, oxy or thio. Specifically, the polyhydric phenolic compound can be bisphenol A in which $A^1$ and $A^2$ are each p-phenylene and Y is isopropylidene.

More specifically, in one embodiment, the polyhydric phenolic compound has the formula

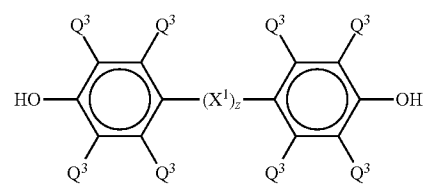

wherein each occurrence of $Q^3$ is independently hydrogen, halogen, unsubstituted or substituted $C_1$-$C_{12}$ hydrocarbyl with the proviso that the hydrocarbyl group is free if a tertiary alpha-carbon, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and $X^1$ has the formula

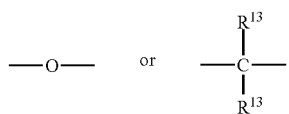

wherein each $R^{13}$ is independently hydrogen, substituted or unsubstituted $C_1$-$C_{12}$ hydrocarbyl, or $C_1$-$C_6$ hydrocarbylene wherein two $R^{13}$ groups collectively form a $C_4$-$C_{12}$ alkylene.

In one embodiment, the polyhydric phenolic compound is of the formula

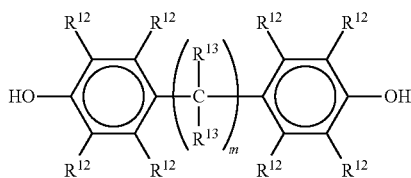

wherein m is one of the numbers 0 and 1, each $R^{12}$ is independently a hydrogen, $C_1$-$C_8$ alkyl free of an aliphatic, tertiary alpha-carbon atom, a phenyl, or a halogen, and $R^{13}$ is independently a hydrogen, a methyl, an ethyl or a phenyl.

Typical examples of $C_1$-$C_8$ alkyl groups free of an aliphatic, tertiary alpha-carbon atom, which $R^{12}$ can be, are methyl, ethyl, n-propyl, isopropyl, n-butyl, secondary butyl (1-methylpropyl), isobutyl (2-methylpropyl), cyclobutyl, the various amyl isomers free of an aliphatic, tertiary alpha-carbon atom, cyclopentyl, the various hexyl isomers free of an aliphatic, tertiary alpha-carbon atom, cyclohexyl, methylcyclohexyl, dimethylcyclohexyl, ethylcyclohexyl, the various heptyl isomers free of an aliphatic, tertiary alpha-carbon atom, the various octyl isomers free of an aliphatic, tertiary alpha-carbon atom, and the like.

The term "free of an aliphatic, tertiary alpha-carbon atom" or the like means that the terminal carbon atom of the alkyl substituent, which is attached to the phenyl nucleus, has at least one hydrogen atom attached to it.

The polyhydric phenolic compound can have more than two hydroxy groups. For example, the polyhydric phenolic compound can be a compound comprising three hydroxy-substituted phenyl moieties bonded to a $C_1$-$C_{12}$ hydrocarbyl moiety. Such polyhydric phenolic compounds can comprise a tris(hydroxy-substituted phenyl) bonded to the same carbon on a $C_1$-$C_6$ moiety, for example, the compound 1,1,1-tris (hydroxyphenyl) ethane.

Specific examples of polyhydric phenolic compounds can include, but are not limited to, 3,3',5,5'-tetramethyl-4,4'-biphenol, 2,2-bis(3-methyl-4-hydroxyphenyl)propane, 2,2-bis(3,5-dimethyl-4-hydroxyphenyl)propane, 1,1-bis(4-hydroxyphenyl)methane, 1,1-bis(4-hydroxyphenyl)ethane, 2,2-bis(4-hydroxyphenyl)propane 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, bis(4-hydroxyphenyl)phenylmethane, 1,1-bis(4-hydroxy-3-methylphenyl)cyclohexane, 1,1-bis(4-hydroxy-3,5-dimethylphenyl)cyclopentane, 1,1-bis(4-hydroxy-3,5-dimethylphenyl)cyclohexane, 1,1-bis(4-hydroxy-3-methylphenyl)cycloheptane, 1,1-bis(4-hydroxy-3,5-dimethylphenyl)cycloheptane, 1,1-bis(4-hydroxy-3-methylphenyl)cyclooctane, 1,1-bis(4-hydroxy-3,5-dimethylphenyl)cyclooctane, 1,1-bis(4-hydroxy-3-methylphenyl)cyclononane, 1,1-bis(4-hydroxy-3,5-dimethylphenyl)cyclononane, 1,1-bis(4-hydroxy-3-methylphenyl)cyclodecane, 1,1-bis(4-hydroxy-3,5-dimethylphenyl)cyclodecane, 1,1-bis(4-hydroxy-3-methylphenyl)cycloundecane, 1,1-bis(4-hydroxy-3,5-dimethylphenyl)cycloundecane, 1,1-bis(4-hydroxy-3-methylphenyl)cyclododecane, 1,1-bis(4-hydroxy-3,5-dimethylphenyl)cyclododecane, 1,1-bis(4-hydroxy-3-t-butylphenyl)propane, 2,2-bis(4-hydroxy-2,6-dimethylphenyl)propane 2,2-bis(4-hydroxy-3-bromophenyl)propane, 1,1-bis(4-hydroxyphenyl)cyclopentane, 1,1-bis(4-hydroxyphenyl)cyclohexane, 1,1,1-tris(3,5-dimethyl-4-hydrxyphenyl)ethane 1,1,1-tris(3-methyl-4-hydroxyphenyl)ethane, 1,3,5-tris(3,5-dimethyl-4-hydroxyphenyl-1-keto)benzene, 1,3,5-tris(3,5-dimethyl-4hydroxyphenyl-1-isopropylidene)benzene, 2,2,4,4-tetrakis (3-methyl-4hydroxyphenyl)pentane, 2,2,4,4-tetrakis(3,5-dimethyl-4-hydroxyphenyl)pentane, 1,1,4,4-tetrakis(3-methyl-4-hydroxyphenyl)cyclohexane, 1,1,4,4-tetrakis(3,5-dimethyl-4-hydroxyphenyl)cyclohexane, 1,3,5-tris(3,5-dimethyl-4-hydroxyphenyl)benzene, 1,3,5-tris(3-methyl-4-hydroxyphenyl)benzene, 2,6-bis(2-hydroxy-5-methylbenzyl)-4-methyl phenol, 4,6-dimethyl-2,4,6-tris(4-hydroxy-3-methylphenyl)-2-heptene, 4,6-dimethyl-2,4,6-tris(4-hydroxy-3,5-dimethylphenyl)-2-heptene, 4,6-dimethyl-2,4,6-tris(4-hydroxy-3-methylphenyl)heptane, 4,6-dimethyl-2,4,6-tris(4-hydroxy-3-methylphenyl)heptane, 2,4-bis(4-hydroxy-3-methylphenylisopropyl)phenol, 2,4-bis (4-hydroxy-3,5-dimethylphenylisopropyl)phenol, tetrakis(4-hydroxy-3-methylphenyl)methane, tetrakis(4-hydroxy-3,5-dimethylphenyl)methane, tetrakis(4-[4-hydroxy-3-methylphenylisopropyl]-phenoxy)methane, tetrakis(4-[4-hydroxy-3,5-dimethylphenylisopropyl]-phenoxy)methane, and mixtures thereof.

The polyhydric phenolic compound can be present, in the redistribution reaction, in an amount of 3 to 25 wt. %, specifically 5 to 20 wt. %, more specifically about 7 to 14 wt. %, based on the weight of said poly(phenylene ether). The use of these relatively minor amounts results in the desired decrease in molecular weight of the poly(phenylene ether), as opposed to its degradation into oligomers of much lower molecular weight.

The reaction between the polyhydric phenolic compound and poly(phenylene ether) is initiated by an aryloxy radical, i.e., a free radical. This aryloxy radical can be either the phenoxy radical of the polyhydric phenolic compound, the phenoxy radical of the poly(phenylene ether), or a mixture of both, wherein a hydrogen is removed from a phenolic hydroxyl group. These phenoxy radicals can be created in various ways, employing a redistribution catalyst. One type of redistribution catalyst is a stable free radical, which can be added to the solution to react with the polyhydric phenolic compound or poly(phenylene ether) in order to create the phenoxy radical. Alternatively, a redistribution catalyst that generates a phenoxy radical in situ can include various oxidizing agents.

The redistribution reaction proceeds at ambient room temperature conditions, but is hastened by heating so that a temperature up to the reflux temperature of the reaction mixture can be used. Generally, no significant advantage is gained by use of subatmospheric or superatmospheric pressure. In one embodiment, the redistribution reaction is performed at a temperature in the range of about 70 to 95° C. for 1 to 5 hours.

Typical examples of free radicals which can be used as a redistribution catalyst to initiate the redistribution reaction between the polyhydric phenolic compound and polyphenylene are: tri-t-butylphenoxy, diphenyl-picrylhydrazyl, the free radical known as galvanoxyl, which is 2,6-di-t-butyl-alpha-(3,5-di-t-butyl-4-oxo-2,5-cyclohexadiene 1-ylidene)-p-tolyloxy, triphenylimidazyl, and tetraphenylpyrryl. These free radicals can be highly colored and, when are added to the reaction mixture of the polyhydric phenolic compound and poly(phenylene ether), can result in the color immediately being discharged due to the formation of the desired phenoxy radical. For example, the stable 2,4,6-tri-t-butylphenoxy free radical is readily prepared by treating a solution of 2,4,4-tri-t-butylphenol in an inert hydrocarbon solvent with an oxidizing agent such as peroxide. This radical is very stable and can be kept for substantial periods of time in solution or can actually be isolated as a solid. It should, however, be kept out of contact with oxygen. One means of stabilizing solutions of this free radical is to add a phenol such as 4-t-butylphenol which reacts with the free radical to produce 4-(4-t-butylphenoxy)-2,4,6-tri-t-butyl-2,5-cyclohexadienone. When gently heated, the 2,4,6-tri-t-butylphenoxy radical is regenerated from this compound.

In addition to stable free radicals, the redistribution catalyst can be a peroxide that is capable of generating aryloxy radicals in situ. The particular peroxide chosen should be one which will decompose at the particular temperature that is used in carrying out the redistribution reaction. Such peroxides can be of formula $$A^3\text{-O}\text{—}\text{O-}A^3$$

wherein $A^3$ is independently hydrogen, $C_1$-$C_{24}$ alkyl, $C_6$-$C_{24}$ aryl, $C_6$-$C_{24}$ aroyl, $C_1$-$C_{24}$ alkanoyl, $C_1$-$C_{24}$ alkenoyl, $C_2$-$C_{24}$ alkoxycarbonyl, sulfuryl, sulfonyl, or phosphoryl. More specifically, each $A^3$ can independently be an unsubstituted benzoyl group or a substituted benzoyl, wherein substituents are $C_1$-$C_6$ hydrocarbyl, nitro, or halogen.

Typical of peroxide compounds represented by the above formula are diacyl peroxides such as benzoylperoxide, 4,4'-di-t-butylbenzoyl peroxide or other aryl substituted derivatives, dilauryl peroxide, acetyl benzoylperoxide, acetyl cyclohexylsulfonyl peroxide or diphthaloyl peroxide, peroxydicarbonates such as diacetylperoxydicarbonate, peroxyacids such as perbenzoic acid, 3-chloroperbenzoic acid, 4-nitroperbenzoic and other substituted derivatives of perbenzoic acid, peroxyacetic acid peroxypropanoic acid, peroxybutanoic acid, peroxynonanoic acid, peroxydodecanoic acid, diperoxyglutaric acid, diperoxyadipic acid, diperoxyoctanedioic acid, diperoxynonanedioic acid, diperoxydodecandioic acid, monoperoxyphthalic acid, as well as inorganic peroxyacids such as peroxysulfuric, peroxydisulfuric, peroxyphosphoric, peroxydiphosphoric and their corresponding salts, and peroxycarboxylic esters such as t-butylperformate, t-butyl peracetate, t-butyl peroxyisobutyrate, t-butylperbenzoate, cumyl perbenzoate, t-butyl peroxynonanoate, t-butylmonoperoxymaleate, t-butylmonoperoxyphthalate, di-t-butyl diperoxyadipates, and 2,5-dimethyl-2,5-bis(benzoylperoxy)hexane. Because they are readily available, benzoyl peroxide, t-butyl perbenzoate, or the like can be specifically selected to generate aryloxy radicals.

Aryloxy radicals can also be generated by redistribution catalysts that are diphenoquinones. They can be readily prepared by the oxidative coupling of the corresponding phenol, for example, as disclosed in U.S. Pat. No. 3,210,384 to Hay. Specific diphenoquinones that are especially useful in generating aryloxy radicals are those 3,3',5,5'-tetrasubstituted diphenoquinones such as 3,3',5,5'-tetramethyl-1,4-diphenoquinone (TMDQ), wherein the substituents are either alkyl groups free of an aliphatic, tertiary alpha-carbon atom or aryl. When the alkyl groups contain an aliphatic, tertiary alpha-carbon atom, the substituents are so large and bulky that they inhibit, if not prevent, the quinone group from generating the aryloxy radical.

The degree of redistribution which will be obtained generally can depend upon the amount and type of redistribution catalyst used to produce aryloxy radicals, whether a peroxide, a diphenoquinone, or a stable free radical. Likewise, the amount of the redistribution that is obtained can depend upon the ratio of the moles of polyhydric phenolic compound used per mole of polymer repeat units in the poly(phenylene ether).

As indicated above, the redistribution reaction serves to decrease the molecular weight of the polymer in the reactive monomer diluent to obtain a new redistributed polymer having a lower molecular weight as evidenced by a decrease in intrinsic viscosity. If the objective in carrying out the redistribution reaction were to produce a large yield of oligomers, the ratio of the polyhydric phenolic compound to the poly(phenylene ether) could be at least one mole of polyhydric phenolic compound per mole of repeat unit in the polymer molecule and, specifically, greater than one mole. Since the objective of the redistribution reaction, in the present process, is to decrease the intrinsic viscosity of the polymer, i.e., to decrease its molecular weight, the ratio of polyhydric phenolic compound to poly(phenylene ether) should be less than one mole of polyhydric phenolic compound per mole of polymer repeat unit, with the ratio being dependent upon the desired degree of redistribution. The lower the ratio of moles of polyhydric phenolic compound to moles of repeat units of the polymer, the nearer the intrinsic viscosity of the poly(phenylene ether) product obtained from the redistribution reaction will approach that of the starting poly(phenylene ether).

The redistribution catalyst present can be present during reaction in an amount of 0.1 to 4.0 wt, specifically 0.2 to 2 wt. %, more specifically 0.4 to 1 wt. %, based on the weight of said poly(phenylene ether).

In one embodiment, the poly(phenylene ether) that is redistributed is the polymerization product of at least one monohydric phenol having the formula

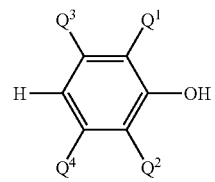

wherein each $Q^1$ and $Q^2$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Q^3$ and $Q^4$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. Suitable monohydric phenols include those described in U.S. Pat. No. 3,306,875 to Hay, specifically monohydric phenols including 2,6-dimethylphenol and 2,3,6-trimethylphenol. More particularly, all of the above $C_1$-$C_{12}$ groups can be $C_1$-$C_7$ groups. As used herein, the term "hydrocarbyl," whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties.

Both redistributed homopolymer and copolymer poly(phenylene ether) are included in the process. In one embodiment, the homopolymers are those containing 2,6-dimethyl-1,4-phenylene ether units. Copolymers can include, for example, random copolymers containing such units in combination with 2,3,6-trimethyl-1,4-phenylene ether units.

The starting poly(phenylene ether) can be prepared by the oxidative coupling of at least one mono hydroxy aromatic compound such as 2,6-xylenol or 2,3,6-trimethylphenol by methods known in the art. Catalyst systems are generally employed for such coupling; they typically contain at least one heavy metal compound such as a copper, manganese, or cobalt compound, usually in combination with various other materials. The polymerization can be performed in a solvent such as benzene or toluene, for example, at a temperature about 20° C. to about 100° C. Thereafter, the catalyst is removed.

After removal of the catalyst, the poly(phenylene ether)-containing solution can be concentrated to a higher solids level as part of the isolation of the poly(phenylene ether) by removing the polymerization solvent. Poly(phenylene ether) is typically a solid at room temperature.

The redistributed poly(phenylene ether) can have the formula

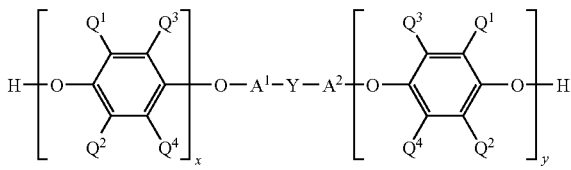

wherein $Q^1$, $Q^2$, $Q^3$, $Q^4$, $A^1$, $A^2$, and Y are as previously defined, x is 0 or a positive number and y is a positive number. In most instances, x+y is 2 to about 100 such that the desired intrinsic viscosity is obtained. A zero value of x can often occur. The hydroxy functionality, on average, is greater than one.

Optionally, in a further step, the present process can further comprise reacting the redistributed poly(phenylene ether) in reactive monomer diluent with a capping agent for the hydroxy groups or terminal ends of the polymer, in order to obtain a functionalized poly(phenylene ether) having unsaturated groups. The functionalization, with an unsaturated group, of the redistributed poly(phenylene ether) can be accomplished in the reactive monomer diluent.

In one embodiment, the redistributed poly(phenylene ether) can be functionalized in the reactive monomer diluent to have an average functionality, with respect to aliphatic unsaturated functional groups, that is greater than about 1, specifically about 2 to 4. Over 90% of the OH (hydroxy) groups in the redistributed poly(phenylene ether) can be functionalized (capped).

In some embodiments, a solvent such as chloroform can optionally be added to lower the viscosity during the capping reaction and then later removed or reduced, for example, by evaporation, prior to obtaining a final varnish composition. Again, the reactive monomer diluent that was present during the reaction producing the redistributed poly(phenylene ether) can remain substantially present. As used herein, the phrase "remain substantially present" will mean that, in terms of total amount of reactive monomer diluent present during the redistribution reaction, at least 70 wt. %, specifically at least 80 wt. %, more specifically at least 90 wt. %, and most specifically essentially 100% of the total reactive monomer remains present in the final curable composition.

The present process, compared to a process in which a poly(phenylene ether) with two terminal OH groups is first polymerized and then added to a reactive monomer diluent, can be very advantageous, since it allows the use of less expensive poly(phenylene ether) that has one terminal hydroxy group and then increases the functionality, by redistribution, at the same time as the intrinsic viscosity is lowered, all while dissolved in reactive monomer diluent. It was surprisingly and unexpectedly found that the redistribution reaction did no caused undesired reaction of the reactive diluent monomer, nor resulted in compositions that were adversely effected when later cured, for example, as a varnish composition used for electrical insulation.

In one embodiment, the capping of the redistributed poly (phenylene ether) provides capping groups having the formula

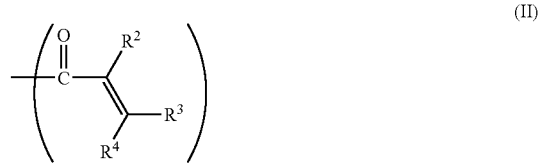

(II)

wherein $R^2$, $R^3$, and $R^4$ are each independently hydrogen, $C_1$-$C_{18}$ hydrocarbyl, $C_2$-$C_{18}$ hydrocarbyloxycarbonyl, nitrile, formyl, carboxylate, imidate, thiocarboxylate, or the like. In some embodiments, the capped poly(phenylene ether) comprises at least one acrylate ($R^2$=$R^3$=$R^4$=hydrogen) or methacrylate ($R^2$=methyl, $R^3$=$R^4$=hydrogen) capping group. It will be understood that the prefix "(meth)acryl-" includes both "acryl-" and "methacryl-". In one embodiment, the $C_1$-$C_{18}$ hydrocarbyl and $C_2$-$C_{18}$ hydrocarbyloxycarbonyl can have up to seven carbons.

The redistributed poly(phenylene ether) can be functionalized for use in accordance with exemplary embodiments of the invention by any suitable method of making capped poly (phenylene ether), including but not limited to the methods described in U.S. Pat. No. 6,897,282 and U.S. Pat. No. 7,329, 708. For example, to make poly(phenylene ether) having (meth)acryloyl end groups according to one embodiment of the invention, the functionalizing or capping agent can be methacrylic anhydride.

In one embodiment, the redistributed poly(phenylene ether) is a capped poly(phenylene ether) having, respectively, two or three methacryloyl end groups. More specifically, the functionalized poly(phenylene ether) can comprise a capped poly(phenylene ether) having the formula

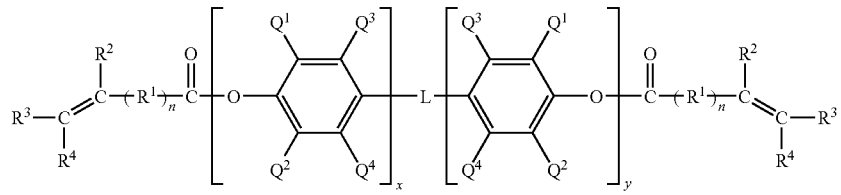

wherein each occurrence of $Q^1$ and $Q^2$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^3$ and $Q^4$ is independently hydrogen, halogen, unsubstituted or substituted $C_1$-$C_{12}$ hydrocarbyl with the proviso that the hydrocarbyl group is not a tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of x and y is independently 0 to about 100 with the proviso that the sum of x and y is 2 to about 100; each occurrence of $R^1$ is independently $C_1$-$C_{12}$ hydrocarbylene; each occurrence of n is independently 0 or 1; each occurrence of $R^2$-$R^4$ is independently hydrogen or $C_1$-$C_{18}$ hydrocarbyl; and L has the formula

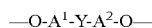

wherein $A^1$ and $A^2$ are independently a monocyclic divalent $C_6$-$C_{16}$ aromatic radical, and Y is a single bond, an oxygen, or a $C_1$-$C_{16}$ bridging radical in which one or two atoms separate $A^1$ from $A^2$.

More specifically, in the above formula, L can have the structure

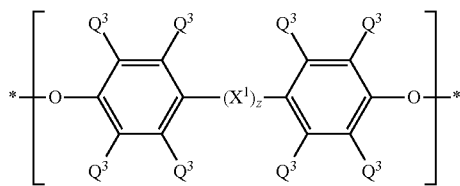

wherein each occurrence of $Q^3$ is independently hydrogen, halogen, unsubstituted or substituted $C_1$-$C_{12}$ hydrocarbyl with the proviso that the hydrocarbyl group is not a tertiary hydrocarbyl, $C_{1-2}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and $X^1$ has the formula

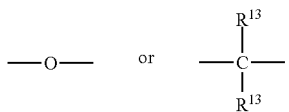

wherein each $R^{13}$ is independently hydrogen, substituted or unsubstituted $C_1$-$C_{12}$ hydrocarbyl, or $C_1$-$C_6$ hydrocarbylene wherein two $R^{13}$ groups collectively form a $C_4$-$C_{12}$ alkylene.

In one specific embodiment, the redistributed poly(phenylene ether) can comprise a capped poly(phenylene ether) having the formula wherein each occurrence of $Q^5$ and $Q^6$ is independently methyl or di-n-butylaminomethyl; and each occurrence of x and y is independently 0 to about 100 with the proviso that the sum of x and y is 2 to about 100.

The process can further comprise, after optional capping, mixing the redistributed poly(phenylene ether) while still in reactive monomer diluent with a second composition comprising, as an additional curable polymer, one or more unsaturated resins to obtain a blended curable composition, as described in detail below. Unsaturated resins can include, for example, polyester resin or vinyl ester resin, or both. The second composition can comprise unsaturated polyester resin or vinyl ester resin, or both, in reactive monomer diluent.

For example, in one embodiment, an unsaturated polyester resin (UPR) can be blended with poly(phenylene ether) by the mixing the UPR in a first solvent with poly(phenylene ether) in a second solvent, wherein the first and second solvent are the same or different reactive monomer diluents.

Although the UPR or vinyl ester resin (VER) can be present during the redistribution reaction, this can be less advantageous, since adding UPR or VE tends to increase solution viscosity that can be undesirable for redistribution and capping. However, it is chemically acceptable for the UPR or VE to be present during the capping reaction.

In one embodiment, the process produces, in a reactive monomer diluent, a blended composition for electrically insulating a motor comprising unsaturated resin (UPR and/or VER) and polyfunctionalized poly(phenylene ether), wherein the latter polymer has at least two acryloyl or methacryloyl end groups and an intrinsic viscosity in the range of about 0.06 deciliter per gram to about 0.25 deciliter per gram, measured in chloroform at 25° C.

In one embodiment, the final varnish composition (for commercial sale or use), prepared by the present process, comprises reactive monomer diluent in an amount of about 20 to about 70 weight percent of the composition and, within this range, specifically greater than or equal to 25 weight percent, more specifically greater than or equal to 30 weight percent, still more specifically greater than or equal to 35 weight percent, and still more specifically greater than or equal to 40 weight percent and, within this range, specifically less than or equal to 65 weight percent, more specifically less than or equal to 60 weight percent, and still more specifically less than or equal to 55 weight percent, and still more specifically less than or equal to 40 weight percent. The total curable polymer (comprising functionalized poly(phenylene ether) and any unsaturated resin) can be present in an amount of about 10 to 45 weight percent of the composition and, within this range, specifically greater than or equal to 15 weight percent, more specifically greater than or equal to 20 weight percent, and still more specifically greater than or equal to 25 weight percent and, within this range, specifically less than or equal to 40 weight percent, more specifically less than or equal to 35 weight percent, and still more specifically less than or equal to 30 weight percent.

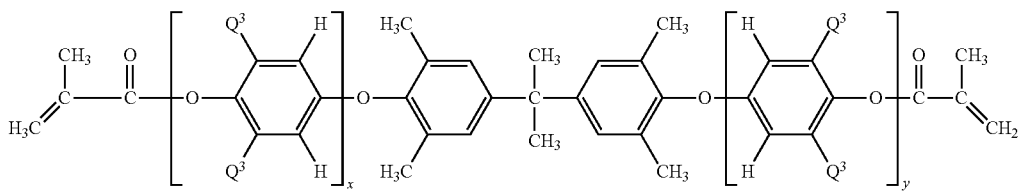

Such a varnish composition can be "solventless" varnish in one embodiment. By solventless is meant that, when combined, the varnish composition can be cured such that the polymers and the reactive monomer diluent can react to form an electrically insulative thermoset. Solventless also means that the composition excludes organic solvents that are incapable of being copolymerized with at least the functionalized PPE.

PPE (poly(phenylene ether)), UPR (unsaturated polyester resin) and VER (vinyl ester resin) have been found to be individually soluble in vinyl toluene or other reactive monomer diluent. A mixture of the two different polymers in reactive monomer diluent, however, can result in the formation of immiscible layers or phases. Phase separation can be particularly fast when using close to a 50:50 mixture by weight of, for example, PPE and UPR and/or VER. Although phase separation can occur at various ratios, it is especially fast when approaching a 50:50 weight polymer mixture as compared, for example, to a 95:5 or 5:95 weight polymer mixture of two different polymers. Varnish compositions containing a blend of PPE and UPR, or PPE and VER, however, can employ a compatibilizing agent to stabilize the polymer mixture before coating. A specific type of compatibilizing agent is a block polymer comprising one block that is derived from an aromatic monomer, specifically a styrenic monomer which would be miscible with the PPE, and another block or chain that would be miscible with the UPE or VER, for example, derived from an acrylate, methacrylate, vinyl acetate, maleic anhydride monomers, or the like, or derived from monomers forming a polyester block such as poly(ethylene terephthalate), poly(butylene terephthalate), poly(tetramethylene terephthalate), and the like. In this case, the block copolymer can be used to prevent phase separation between two polymers that are otherwise immiscible.

In an exemplary embodiment, block copolymers for use as compatibilizing agents are commercially available from Arkema Inc. (Philadelphia) under the family trademark NANOSTRENGTH, in which relatively polar poly(methyl methacrylate) PMMA blocks are included with a styrene block and a butadiene block in the copolymers. NANOSTRENGTH copolymers consist of a polystyrene-block-poly (1,4-butadiene)-block-poly(methyl methacrylate), referred to as an SBM block copolymer. Illustrative species include the block copolymers available from Arkema and sold as NANOSTRENGTH E20, A012, A123, and A250. Such SBM block copolymers are also commercially available from Arkema under the family trademark CLEARSTRENGTH. Other block copolymers of styrene-polyolefin-methyl methacrylate that can be employed are commercially available from Atofina, including AF-X223, AF-X333, AF-X012, AF-X342, AF-X004, and AF-X250.

An unsaturated polyester resin, for use in the process, can generally be obtained by reaction of at least one polyhydric alcohol with at least one polybasic acid comprising an unsaturated polybasic acid. Specific examples of unsaturated polybasic acids that can be used to form the unsaturated polyester resin include maleic acid, fumaric acid, itaconic acid, citraconic acid, chloromaleic acid, dimeric methacrylic acid, nadic acid, tetrahydrophthalic acid, endo-methylenetetrahydrophthalic acid, hexachloro-endo-methylenetetrahydrophthalic acid, halogenated phthalic acids, and the like, as well as their corresponding esters and anhydrides. Specific unsaturated acids include maleic acid, fumaric acid, and their esters and anhydrides.

The polyfunctional saturated and aromatic acids can be employed in conjunction with the polybasic unsaturated acids to reduce the density of the ethylenic unsaturation and provide the desired chemical and mechanical properties to the coating. Examples of saturated and aromatic polybasic acids include succinic acid, adipic acid, sebacic acid, azelaic acid, dodecanedioic acid, eicoic acid, phthalic acid, isophthalic acid, terephthalic acid, and the like, as well as their esters and anhydrides. Preferred aromatic polybasic acids include phthalic acid, isophthalic acid, and their esters and anhydrides.

Examples of polyhydric alcohols include ethylene glycol, propylene glycol, diethylene glycol, dipropylene glycol, 1,2-butanediol, 1,3-butanediol, 1,4-butanediol, neopentyl glycol, glycerol, triethylene glycol, pentanediol, hexylene glycol, hydrogenated bisphenol A, bisphenol A-alkylene oxide adducts, tetrabromobisphenol A-alkylene oxide adducts, and the like. An exemplary polyhydric alcohol is propylene glycol.

In one embodiment, the unsaturated polyester is the reaction product of at least one polyhydric alcohol comprising propylene glycol; at least one unsaturated polybasic acid comprising maleic acid or maleic anhydride; and at least one aromatic polybasic acid comprising phthalic acid, phthalic anhydride, or isophthalic acid. Unsaturated polyester resins are commercially available, often as compositions further comprising an alkenyl aromatic monomer, and include, for example, the unsaturated polyester resins obtained from Ashland Chemical as Ashland Q6585 and MR14072, and from Alpha Owens Corning as AOC-XV2346. The unsaturated polyester resin obtained from Ashland as Q6585 is described by its manufacturer as "high-reactivity, thickenable, polyester resin for use in low profile and controlled shrink applications." The datasheet supplied with the material indicates a styrene content of 35 weight percent. Another unsaturated polyester resin is commercially available as 707C from Von Roll (Schenectady, N.Y.). The latter unsaturated polyester resin in vinyl toluene (without PPE) has been used for varnishes.

As an alternative to, or in combination with, the unsaturated polyester, the curable varnish composition can comprise a vinyl ester resin. Whereas an unsaturated polyester resin has vinyl bonds randomly placed in the main chain, a vinyl ester resin has vinyl bonds at both chain ends. In particular, one example of a vinyl ester resin is commercially available from Dow (Michigan) as DERAKANE® M311-450. In one embodiment, the vinyl ester resin is a linear reaction product of bisphenol A and an epichlorohydrin epoxy that is terminated with an unsaturated acid such as methacrylic acid.

In a final varnish, any suitable weight ratio of total curable polymers to reactive monomer diluent can be used, although the weight ratio can be between about 2:1 to about 1:5 by weight, for example, UPR-plus-PPE:solvent, and specifically can be about 1:1 by weight, for example, with respect to UPR-plus-PPE:solvent. However, these ratios can be further varied, for example, if any additives or crosslinking agents are added which can further enhance varnish performance.

Varnish compositions according to exemplary embodiments can form thermosets that have superior properties, including a significantly higher glass transition temperature ($T_g$), which generally is at least about 70° C. and can range up to about 170° C. or higher. More typically, the $T_g$ can be about 100° C. to about 165° C. As a result, the varnishes can exhibit greater thermal stability compared to varnishes containing unsaturated polyester resin alone as curable polymer.

The varnish composition can generally be applied to a generator or motor winding, such as a traction motor winding for a locomotive or off-highway vehicle, and cured. In an exemplary embodiment, the curing process results in a chemical reaction in which the reactive monomer diluent chemically reacts with the curable polymers, for example, PPE and UPR, and together forms a thermoset varnish coating that protects the entire motor winding assembly. The curing can be self-initiating or can require initiation of the reaction between curable polymer and reactive monomer diluent through the use of a curing initiator.

The curing initiator can include any compound capable of producing free radicals at elevated temperatures. Such curing initiators can include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, di(t-butylperoxy)isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures thereof. Suitable non-peroxy initiators include, for example, 2,3-dimethyl-2,3-diphenylbutane, 2,3-trimethylsilyloxy-2,3-diphenylbutane, and the like, and mixtures thereof. The curing initiator can further include any compound capable of initiating anionic polymerization of the unsaturated components. Such anionic polymerization initiators include, for example, alkali metal amides such as sodium amide ($NaNH_2$) and lithium diethyl amide ($LiN(C_2H_5)_2$), alkali metal and ammonium salts of $C_1$-$C_{10}$ alkoxides, alkali metal hydroxides, ammonium hydroxides, alkali metal cyanides, organometallic compounds such as the alkyl lithium compound n-butyl lithium, Grignard reagents such as phenyl magnesium bromide, and the like, and combinations thereof. In one embodiment, the curing initiator is a peroxide, such as 2,5-bis-(t-butyl peroxy)-2,5-dimethyl-3-hexane or dicumyl peroxide or combinations thereof. The curing initiator can promote curing at a temperature in a range of about 0° C. to about 200° C. When employed, the curing initiator is typically used in an amount of about 0.005 to about 2 parts by weight per 100 parts by weight total of curable polymer (PPE, UPR, and/or VER) and reactive monomer diluent.

There is no particular limitation on the method by which the composition can be cured. The composition can, for example, be cured thermally or by using irradiation techniques, including radio frequency heating, UV irradiation, and electron beam irradiation. For example, the composition can be cured by initiating chain-reaction curing with 10 seconds of radio frequency heating. When heat curing is used, the temperature selected can be about 80° to about 300° C., and the heating period can be about 5 seconds to about 24 hours. For example, if the curing initiator is dicumyl peroxide, the varnish can be cured for a time in the range of about 1 minute to about 10 hours at temperatures in the range of about 120° C. to about 200° C.

Curing can be conducted in multiple steps using different times and temperatures for each step. For example, curing can be staged to produce a partially cured and often tack-free resin, which then is fully cured by heating for longer periods or at higher temperatures. One skilled in the thermoset arts is capable of determining suitable curing conditions without undue experimentation. In some embodiments, the composition can be partially cured. However, references herein to properties of the "cured composition" or the "composition after curing" generally refer to compositions that are substantially fully cured. One skilled in the thermoset arts can determine whether a sample is substantially fully cured without undue experimentation. For example, one can analyze the sample by differential scanning calorimetry to look for an exotherm indicative of additional curing occurring during the analysis. A sample that is substantially fully cured will exhibit little or no exotherm in such an analysis.

The varnish composition can be applied and cured according to any suitable technique. One example of such a method is the vacuum pressure impregnation method, in which an entire motor winding assembly is placed in a pressure vessel under a high vacuum that draws out entrapped air and other gases. The varnish is introduced to the pressure vessel and the entire tank is pressurized, typically to at least 0.62 megaPascal (90 pounds per square inch) or higher to achieve a total penetration of the winding. The assembly can be baked at elevated temperatures to cure the varnish composition, i.e. to cause the main polymers, the reactive monomer diluent, and any additives to form a thermoset, producing a solid, sealed insulation system substantially impervious to moisture. Other suitable coating and curing techniques include dip coat and trickle treat, by way of example only.

A crosslinking agent can be added to the varnish composition to even further enhance ductility and thermal stability, particularly in embodiments in which the PPE has a relatively low intrinsic viscosity. A crosslinking agent is defined as a compound comprising at least two polymerizable groups selected from carbon-carbon double bonds, carbon-carbon triple bonds, and combinations thereof. Specifically, in the case of capped poly(phenylene ether), the crosslinking agent has functional groups that are same as the PPE end caps. For example, where the end caps are methacrylate groups, particularly suitable crosslinking agents include methacrylate-grafted polybutadiene, trimethylolpropane triacrylate (TMPTA), ethoxylated bisphenol A dimethacrylate, and combinations thereof.

Other suitable crosslinking agents include, for example, divinylbenzenes, diallylbenzenes, trivinylbenzenes, triallylbenzenes, divinyl phthalates, diallyl phthalates, triallyl mesate, triallyl mesitate, triallyl cyanurate, triallyl isocyanurate, trimethylolpropane tri(meth)acrylate, 1,6-hexanediol di(meth)acrylate, neopentyl glycol di(meth)acrylate, dipropylene glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, (ethoxylated)$_{2-40}$ 1,6-hexanediol di(meth)acrylates, (propoxylated)$_{2-40}$ 1,6-hexanediol di(meth)acrylates, (ethoxylated)$_{2-40}$ 1,4-butanediol di(meth)acrylates, (propoxylated)$_{2-40}$ 1,4-butanediol di(meth)acrylates, (ethoxylated)$_{2-40}$ 1,3-butanediol di(meth)acrylates, (propoxylated)$_{2-40}$ 1,3-butanediol di(meth)acrylates, (ethoxylated)$_{2-40}$ ethylene glycol di(meth)acrylates, (propoxylated)$_{2-40}$ ethylene glycol di(meth)acrylates, (ethoxylated)$_{2-40}$ propylene glycol di(meth)acrylates, (propoxylated)$_{2-40}$ propylene glycol di(meth)acrylates, (ethoxylated)$_{2-40}$ 1,4-cyclohexanedimethanol di(meth)acrylates, (propoxylated)$_{2-40}$ 1,4-cyclohexanedimethanol di(meth)acrylates, (ethoxylated)$_{2-40}$ bisphenol-A di(meth)acrylates, (propoxylated)$_{2-40}$ bisphenol-A di(meth)acrylates, (ethoxylated)$_{3-60}$ glycerol tri(meth)acrylates, (propoxylated)$_{3-60}$ glycerol tri(meth)acrylates, (ethoxylated)$_{3-60}$ trimethylolpropane tri(meth)acrylates, (propoxylated)$_{3-60}$ trimethylolpropane tri(meth)acrylates, (ethoxylated)$_{3-60}$ isocyanurate tri(meth)acrylates, (propoxylated)$_{3-60}$ isocyanurate tri(meth)acrylates, (ethoxylated)$_{4-80}$ pentaerythritol tetra(meth)acrylates, (propoxylated)$_{4-80}$ pentaerythritol tetra(meth)acrylates, (ethoxylated)$_{6-120}$ dipentaerythritol tetra(meth)

acrylates, (propoxylated)$_{6-120}$ dipentaerythritol tetra(meth) acrylates, and the like, and mixtures thereof.

When present, the crosslinking agent can be used in an amount of about 1 to about 30 parts by weight, based on 100 parts by weight in total of the PPE, UPR and/or VER, and reactive monomer diluent. Within this range, the crosslinker can be present in an amount specifically up to 25 parts by weight, more specifically up to 20 parts by weight and, within this range, specifically greater than or equal to 5 parts by weight, more specifically greater than or equal to 10 parts by weight, and still more specifically greater than or equal to 15 parts by weight.

Additives can further include curing inhibitors and/or stabilizers that can increase shelf life of the varnish compositions. Suitable curing inhibitors include, for example, diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, monoalkylhydroquinones, p-methoxyphenol, t-butylhydroquinone, $C_1$-$C_6$-alkyl-substituted catechols (such as 4 tert-butylcatechol), dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and the like, and combinations thereof. Suitable curing inhibitors further include poly(phenylene ether)s having free hydroxyl groups. When present, the curing inhibitor amount can be about 0.001 to about 10 parts by weight per 100 parts by weight of the total composition. If added, the curing inhibitors can be in combination with or in lieu of curing initiators.

The composition can, optionally, further comprise one or more additives such as, for example, dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, substrate adhesion agents, mold release agents, toughening agents, low-profile additives, stress-relief additives, and combinations thereof. It is desirable that certain thermoplastics commonly referred to as "low profile additives" (LPAs) are absent from the composition. During curing, an LPA is rejected from the cured matrix and isolated as solid domains, typically less than about 5 micrometers in size, which distinct LPA domains dispersed in the cured matrix act as strain relief sites. Accordingly, the absence of LPAs in the composition can prevent weak points for dielectric breakthrough.

Exemplary embodiments of the varnish composition prepared by the present process, when cured, can exhibit thermal stability above 180° C., including significant improvement in less weight loss after aging for 100 hours at 215° C. Other advantageous properties include hydrolytic stability and less cracking or chipping. Desirable mechanical or electrical properties can also be obtained, namely low dielectric constant and dissipation factor, dimensional stability, and chemical resistance, especially to acid or base. The resulting balance of properties is an improvement compared to the use of unsaturated polyester resin alone. Consequently, the present varnish can significantly extend the life of traction motors and the like.

The invention includes at least the following embodiments:

Embodiment 1: A process for preparing a redistributed poly(phenylene ether), comprising reacting a poly(phenylene ether) in a reactive monomer diluent with a polyhydric phenolic compound in the presence of a redistribution catalyst to form a composition comprising redistributed poly(phenylene ether) in the reactive monomer diluent.

Embodiment 2: The process of embodiment 1 wherein the redistributed poly(phenylene ether) has a lower intrinsic viscosity, a lower weight average molecular weight, and a higher hydroxy functionality than said poly(phenylene ether).

Embodiment 3: The process of embodiment 1 or 2 wherein the intrinsic viscosity of said poly(phenylene ether) before distribution is 0.12 to 4.0 deciliter per gram and the intrinsic viscosity of the redistributed poly(phenylene ether) is 0.06 to 0.25 deciliter per gram, measured in chloroform at 25° C.

Embodiment 4: The process of any of embodiments 1-3 wherein the intrinsic viscosity of the redistributed poly(phenylene ether) is 0.01 to 0.35 decimeter per gram lower than the intrinsic viscosity of said poly(phenylene ether) before reaction, measured in chloroform at 25° C.

Embodiment 5: The process of any of embodiments 1-4 wherein the weight average molecular weight of said poly (phenylene ether) before redistribution is 5000 to 50000 g/mol, and the weight average molecular weight of the redistributed poly(phenylene ether) is 1000 to 10000 g/mol.

Embodiment 6: The process of any of embodiments 1-5 wherein the weight average molecular weight of the redistributed poly(phenylene ether) is 10 to 90 percent lower than the weight average molecular weight of said poly(phenylene ether) before reaction.

Embodiment 7: The process of any of embodiments 1-6 wherein the hydroxy functionality of the poly(phenylene ether) is 1, and the hydroxy functionality of the redistributed poly(phenylene ether) is greater than 1 (on average).

Embodiment 8: The process of any of embodiments 1-7 wherein the reactive monomer diluent is selected from the group consisting of vinyl toluene, styrene, butyl styrenes, dibromostyrenes, α-methyl styrene, p-methyl styrene, and combinations thereof.

Embodiment 9: The process of any of embodiments 1-8 wherein substantially no organic solvent other than reactive monomer diluent is present during reaction.

Embodiment 10: A process for the preparing a redistributed poly(phenylene ether), comprising reacting a composition that comprises a poly(phenylene ether) having an intrinsic viscosity of 0.12 to 0.4 deciliter per gram, measured in chloroform at 25° C., and a functionality of 1; a polyhydric phenolic compound in the presence of a redistribution catalyst; and reactive monomer diluent selected from the group consisting of vinyl toluene, styrene, butyl styrenes, dibromostyrenes, α-methyl styrene, p-methyl styrene, and combinations thereof, wherein substantially no organic solvent other than reactive monomer diluent is present during reaction; and wherein a redistributed poly(phenylene ether) is obtained having an intrinsic viscosity of 0.06 to 0.25 deciliter per gram that is 0.1 to 0.35 deciliter per gram lower than the intrinsic viscosity of said poly(phenylene ether), measured in chloroform at 25° C.

Embodiment 11: The process of any of embodiments 1-10 wherein the polyhydric phenolic compound comprises two to four hydroxy-phenyl groups attached to a $C_1$-$C_{16}$ hydrocarbyl moiety.

Embodiment 12: The process of any of embodiments 1-11 wherein the polyhydric phenolic compound has the formula HO-$A^1$-Y-$A^2$-OH, wherein $A^1$ and $A^2$ are independently a monocyclic divalent $C_6$-$C_{16}$ aromatic radical, and Y is a single bond, an oxygen, or a $C_1$-$C_{16}$ bridging radical in which one or two atoms separate $A^1$ from $A^2$.

Embodiment 13: The process of any of embodiments 1-12 wherein the polyhydric phenolic compound has the formula

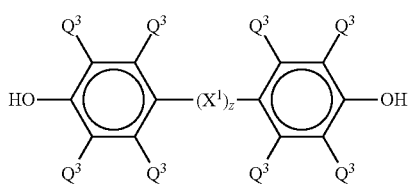

wherein each occurrence of $Q^3$ is independently hydrogen, halogen, unsubstituted or substituted $C_1$-$C_{12}$ hydrocarbyl with the proviso that the hydrocarbyl group is free of a tertiary alpha-carbon atom, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and $X^1$ has the formula

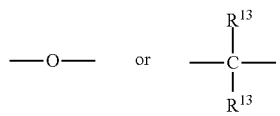

wherein each $R^{13}$ is independently hydrogen, substituted or unsubstituted $C_1$-$C_{12}$ hydrocarbyl, or $C_1$-$C_6$ hydrocarbylene wherein two $R^{13}$ groups collectively form a $C_4$-$C_{12}$ alkylene.

Embodiment 14: The process of any of embodiments 1-13 wherein the polyhydric phenolic compound is a compound comprising three hydroxy-substituted phenyl moieties bonded to a $C_1$-$C_{12}$ hydrocarbyl moiety.

Embodiment 15: The process of any of embodiments 1-14 wherein the redistribution catalyst comprises a peroxide or a quinone compound.

Embodiment 16: The process of any of embodiments 1-15 further comprising reacting the redistributed poly(phenylene ether) in reactive monomer diluent with a capping agent to obtain a functionalized poly(phenylene ether) in which unsaturated groups are bonded to the redistributed poly(phenylene ether).

Embodiment 17: The process of embodiment 16 wherein the functionalized poly(phenylene ether) in the reactive monomer diluent has a functionality, on average, with respect to aliphatic unsaturated functional groups, of greater than 1.

Embodiment 18: The process of any of embodiments 16-17 wherein the functionalized poly(phenylene ether) is a capped poly(phenylene ether) having, on average, 2 or 3 methacryloyl functional end groups.

Embodiment 19: The process of any of embodiments 16-18 wherein over 90% of the hydroxy groups in the redistributed poly(phenylene ether) has been capped with an unsaturated group.

Embodiment 20: The process of any of embodiments 16-19 further comprising mixing a first composition comprising the functionalized poly(phenylene ether) in reactive monomer diluent with a second composition comprising an unsaturated resin to obtain a blended curable composition.

Embodiment 21: The process of any of embodiments 16-20 wherein the unsaturated resin in the second composition comprises unsaturated polyester resin or vinyl ester resin or both unsaturated polyester resin and vinyl ester resin.

Embodiment 22: The process of any of embodiments 16-21 wherein the ratio of the total amount of functionalized poly(phenylene ether) and unsaturated resin to the reactive monomer diluent is about 2:1 to about 1:5 by weight.

Embodiment 23: A method for electrically insulating a motor using a varnish composition comprising applying a varnish composition comprising a blended curable composition made by the process comprising any of embodiments 1 to 22 to a motor component; and curing the varnish composition to form an electrically insulative thermoset coating over the motor component.

The following examples are presented by way of illustration only and not by way of limitation.

EXAMPLE 1

Preparation of Low Intrinsic Viscosity Methacrylate Capped Poly(Phenylene ether) using Benzoyl Peroxide In this example a peroxide compound was used as a redistribution catalyst for 10.0 grams of poly(phenylene ether) (SA120 available from SABIC Innovative Plastics in Selkirk N.Y.) having an intrinsic viscosity of 0.12 deciliters per gram, measured at 25° C., a weight average molecular weight of 7100, and a number average molecular weight of 2700. These materials were dissolved in 14 milliliters of vinyl toluene at 80° C. To this was added 0.6 gram of bisphenol A and 0.6 gram of benzoyl peroxide (BPO). (The addition of the BPO is exothermic, so that portions of the BPO can be added over time to limit the increase in temperature when carrying out the process on a larger scale.)

The resulting composition was heated with stirring for 3.5 hours at a temperature of 90° C. At this point, gel permeation chromatographic (GPC) analysis in chloroform of a small sample showed the redistributed polymer to have a number average molecular weight ($M_n$) of 1923 and a weight average molecular weight ($M_w$) of 4135.

Next, 3.5 milliliters of methacrylic anhydride (MAA) and 300 milligrams of dimethylaminopyridine were added. Heating at 90° C. was continued overnight. Then 1 milliliter water was added to quench excess methacrylic acid anhydride (MAA). After the reaction mixture was cooled to room temperature, it was diluted with 50 milliliters of chloroform to decrease viscosity for a cleaner phase separation, since high viscosity organic phases can lead to stubborn emulsion formation. The solution was transferred to a separatory funnel and washed once with dilute HCl and twice with $NaHCO_3$ solution. After drying with anhydrous $K_2CO_3$, the chloroform and other volatiles were removed under reduced pressure using a rotary evaporator (the boiling point of chloroform is 61° C. and that of vinyl toluene is 170-171° C.) yielding 25 grams of methacrylate capped low intrinsic viscosity poly(phenylene ether) (PPE) in vinyl toluene (about 50% solution). Since the MAA was added in excess, all the hydroxy groups were capped.

EXAMPLE 2

Preparation of Low Intrinsic Viscosity Methacrylate Capped Poly(phenylene ether) using 3,3',5,5'-Tetramethylphenoquinone In this example, a quinone compound was used as a redistribution catalyst for 10.0 g of poly(phenylene ether) (SA120 available from SABIC Innovative Plastics in Selkirk N.Y.) having an intrinsic viscosity of 0.12 deciliters per gram, measured at 25° C., and a weight average molecular weight of 7100 and a number average molecular weight of 2700. These materials were dissolved in 14 mL of vinyl toluene at 80° C. To this was added 1.0 g of bisphenol A and 250 mg of 3,3',5,5'-tetramethyldiphenoquinone (TMDQ). The result was heated with stirring overnight at a temperature of 85-90° C. At this point, GPC (gel permeation chromatography) in chloroform (using polystyrene standards) of a small sample showed the redistributed polymer to have a number average molecular weight ($M_n$) of 1848 and a weight average molecular weight ($M_w$) of 4087.

Next, 3.5 milliliter of methacrylic anhydride (MAA) and 300 milligram of N,N-dimethylaminopyridine were added, and heating at 85-90° C. was continued overnight. Then the reaction temperature was cooled to 60-65° C., and 2 milliliters methanol was added to quench excess MAA. After stirring for an hour the reaction mix was cooled to room temperature and then diluted with 50 milliliter of chloroform. The solution was transferred to a separatory funnel and washed once with dilute HCl and twice with $NaHCO_3$ solution. After drying with anhydrous $K_2CO_3$, the chloroform and other volatiles were removed under reduced pressure using a rotary evaporator, yielding 24.2 grams of methacrylate capped low intrinsic viscosity poly(phenylene ether) in vinyl toluene (about 50% solution).

EXAMPLE 3

Preparation of Low Intrinsic Viscosity Methacrylate Capped Poly(Phenylene ether) using Benzoyl Peroxide and (1,1,1-Tris(hydroxyphenyl)ethane)

In this example a quinone compound was used as a redistribution catalyst, as in Example 2, but using THPE (1,1,1-tris(hydroxyphenyl)ethane) instead of bisphenol A to prepare a trifunctionalized capped poly(phenylene ether) instead of a bifunctionalized capped poly(phenylene ether).

First, 10.0 grams of poly(phenyl ether) (SA120 available from SABIC Innovative Plastics in Selkirk N.Y.) was obtained, having an intrinsic viscosity of 0.12 deciliters per gram, measured at 25° C., a weight average molecular weight of 7100, and a number average molecular weight of 2700. This was dissolved in 14 mL of vinyl toluene at 70° C. To this was added a solution of 700 milligrams of 1,1,1-tris(hydroxyphenyl)ethane (THPE) in 2 milliliters methanol. Next, 700 milligrams of benzoyl peroxide was added, and the temperature was increased to approximately 85° C. After 1.5-2.0 hours at this temperature, the methanol was stripped off under vacuum.

Next, 3.5 milliliters of methacrylic anhydride (MAA) and 300 milligrams of dimethylamino-pyridine were added, and heating was continued overnight. Then the reaction temperature was cooled to 60-65° C. and 2 milliliters methanol was added to quench excess MAA. After stirring for an hour the reaction mixture was cooled to room temperature and then diluted with 50 milliliters of chloroform. The solution was transferred to a separatory funnel and washed once with dilute HCl and twice with $NaHCO_3$ solution. After drying with anhydrous $K_2CO_3$, the chloroform was removed under reduced pressure using a rotary evaporator yielding 22.2 grams of methacrylate capped low IV poly(phenylene ether) in vinyl toluene. A small sample was used for analytical studies. Part of it was stripped in a vacuum oven at about 90° C. for 3 days. The solids content was determined to be 55%. Gel Permeation Chromatographic (GPC) analysis ($CHCl_3$) indicated a number average molecular weight ($M_n$) of 1206 and a weight average molecular weight ($M_w$) of 4365. Another small portion of the solution was precipitated into methanol. After drying, GPC analysis showed the number average molecular weight ($M_n$) to be 792 with a weight average molecular weight ($M_w$) of 4535.

COMPARATIVE EXAMPLE 4

Preparation of Low Intrinsic Viscosity Methacrylate Capped Poly(Phenylene ether) using Benzoyl Peroxide and (1,1,1-Tris(hydroxyphenyl)ethane) in Toluene In this comparative example, 1,1,1-tris(hydroxyphenyl)ethane (THPE), as in Example 3, was used for redistribution, but this time the organic solved was toluene instead of vinyl toluene.

First, 16.7 grams of poly(phenylene ether) (SA120 available from SABIC Innovative Plastics in Selkirk N.Y.) having an intrinsic viscosity of 0.12 deciliters per gram, measured at 25° C., was dissolved in 80 milliliters of toluene at 60° C. To this was added a solution of 1.5 grams 1,1,1-tris(hydroxyphenyl)ethane (THPE) in 4 mL methanol. Next, 1.5 grams of benzoyl peroxide was added as redistribution catalyst, and the temperature was increased to approximately 80° C. After 3 hours at this temperature, the solvent was stripped off under vacuum. The resulting solid was then put in a vacuum oven at 90° C. for 3 days. The yield of redistributed poly(phenylene ether) was 17.3 grams. GPC analysis as before showed a number average molecular weight ($M_n$) of 1719 and a weight average molecular weight ($M_w$) of 3686.

Next, 16.5 grams of the poly(phenylene ether) was combined with 17.5 grams vinyl toluene, 5.7 milliliters of methacrylic anhydride (MAA), and 500 milligrams of dimethylaminopyridine and heated to 80° C. overnight. Then the reaction temperature was cooled to 60-65° C., and 3 milliliters methanol was added to quench excess MAA. After stirring for an hour the reaction mixture was cooled to room temperature and then diluted with 50 milliliters of chloroform. The solution was transferred to a separatory funnel and washed once with dilute HCl and twice with $NaHCO_3$ solution. After drying with anhydrous $K_2CO_3$, the sample was stripped under reduced pressure using a rotary evaporator yielding 32.5 grams of methacrylate capped low intrinsic viscosity poly(phenylene ether) in vinyl toluene.

Samples of these two trifunctional methacrylate functional poly(phenylene ether)s, from Example 3 and Comparative Example 4, were then formulated with 1.5% dicumyl peroxide and 0.05% t-butyl catechol (based on total weight of PPE and vinyl toluene). The cure of each was then evaluated by Differential Scanning Calorimetry (DSC) (30-220° C. at 10° C./min). The formulation based on redistribution in vinyl toluene exhibited a cure peak temperature of 133° C. and a ΔH of reaction of 218 Joules/gram. The blend containing polymer prepared by the comparative example in toluene showed a peak temperature of 133° C. and a ΔH of reaction of 207 Joules/gram. Based on the molecular weight and cure data, it is clear that the catalytic redistribution in the reactive monomer diluent was successful, without adverse effect.

EXAMPLE 5

This is a theoretical example. A method described above is used to make a curable composition comprising redistributed and methacrylate capped poly(phenylene ether) (PPE) in vinyl toluene. The PPE, along with a dimethacrylate crosslinking agent and compatibilizing agent, is then used to make a curable composition by admixture with unsaturated polyester resin (UPR), in a weight ratio of 60:40, wherein the vinyl toluene is employed at a concentration of 55 percent, by weight of total composition. The crosslinking agent is SR348 (an ethoxylated bisphenol A dimethacrylate commercially available from Sartomer of Exton, Pa., USA), added in a weight ratio of 6:4:1 of PPE-plus-UPR/vinyl toluene/crosslinker. The compatibilizing agent is NANOSTRENGTH E20 block copolymer consisting of a polystyrene-block-poly(1,4-butadiene)-block-poly(methyl methacrylate), which is added in a weight ratio of 6:4:2 of PPE-plus-UPR/vinyl toluene/compatibilizing agent. Then, 2% by weight of 2,5-bis-(t-butyl peroxy)-2,5-dimethyl-3-hexane (commercially available as TRIGONOX 101 from Akzo Nobel Polymer Chemicals of Chicago, Ill.) is added as the curing initiator. The varnish is degassed under vacuum and then cured to a thermoset at 110° C. for 2 hours, then at 150° C. for 30 minutes in a preheated convection oven.

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A process for preparing a redistributed poly(phenylene ether), comprising:
   reacting a poly(phenylene ether) in a reactive monomer diluent with a polyhydric phenolic compound in the presence of a redistribution catalyst to form a composition comprising redistributed poly(phenylene ether) in the reactive monomer diluent.

2. The process of claim 1 wherein the redistributed poly(phenylene ether) has a lower intrinsic viscosity, a lower weight average molecular weight, and a higher hydroxy functionality than the poly(phenylene ether) before redistribution.

3. The process of claim 1 wherein the intrinsic viscosity of said poly(phenylene ether) before distribution is 0.12 to 4.0 deciliter per gram, and the intrinsic viscosity of the redistributed poly(phenylene ether) is 0.06 to 0.25 deciliter per gram, measured in chloroform at 25° C.

4. The process of claim 1 wherein the intrinsic viscosity of the redistributed poly(phenylene ether) is 0.01 to 0.35 decimeter per gram lower than the intrinsic viscosity of the poly(phenylene ether) before redistribution, measured in chloroform at 25° C.

5. The process of claim 1 wherein the weight average molecular weight of the poly(phenylene ether) before redistribution is 5000 to 50000 g/mol, and the weight average molecular weight of the redistributed poly(phenylene ether) is 1000 to 10000 g/mol.

6. The process of claim 1 wherein the weight average molecular weight of the redistributed poly(phenylene ether) is 10 to 90 percent lower than the weight average molecular weight of the poly(phenylene ether) before redistribution.

7. The process of claim 1 wherein the hydroxy functionality of the poly(phenylene ether) before redistribution is 1, and the hydroxy functionality of the redistributed poly(phenylene ether) is greater than 1.

8. The process of claim 1 wherein the reactive monomer diluent is selected from the group consisting of vinyl toluene, styrene, butyl styrenes, dibromostyrenes, α-methyl styrene, p-methyl styrene, and combinations thereof.

9. The process of claim 1 wherein substantially no organic solvent other than reactive monomer diluent is present during redistribution.

10. The process of claim 1 wherein the polyhydric phenolic compound comprises two to four hydroxy-phenyl groups attached to a $C_1$-$C_{16}$ hydrocarbyl moiety.

11. The process of claim 1 wherein the polyhydric phenolic compound has the formula $$HO-A^1-Y-A^2-OH$$

wherein $A^1$ and $A^2$ are independently a monocyclic divalent $C_6$-$C_{16}$ aromatic radical, and Y is a single bond, an oxygen, or a $C_1$-$C_{16}$ bridging radical in which one or two atoms separate $A^1$ from $A^2$.

12. The process of claim 11 wherein the polyhydric phenolic compound has the formula

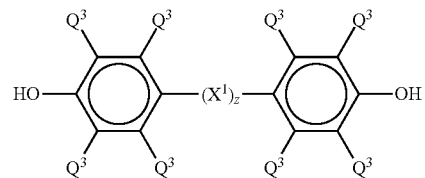

wherein each occurrence of $Q^3$ is independently hydrogen, halogen, unsubstituted or substituted $C_1$-$C_{12}$ hydrocarbyl with the proviso that the hydrocarbyl group is free of a tertiary alpha-carbon atom, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and $X^1$ has the formula

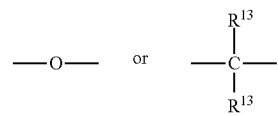

wherein each $R^{13}$ is independently hydrogen, substituted or unsubstituted $C_1$-$C_{12}$ hydrocarbyl, or $C_1$-$C_6$ hydrocarbylene wherein two $R^{13}$ groups collectively form a $C_4$-$C_{12}$ alkylene.

13. The process of claim 12 wherein the polyhydric phenolic compound has the formula

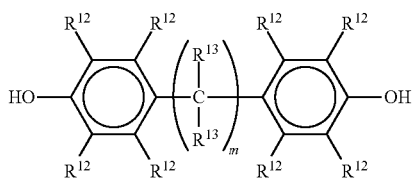

wherein m is one of the numbers 0 and 1, each $R^{12}$ is a hydrogen, a $C_1$-$C_8$ alkyl free of a tertiary alpha-carbon atom, a phenyl, or a halogen, and $R^{13}$ is independently a hydrogen, methyl, ethyl, phenyl, or hydroxy-phenyl.

14. The process of claim 1 wherein the polyhydric phenolic compound is a compound comprising three hydroxy-substituted phenyl moieties bonded to a $C_1$-$C_{12}$ hydrocarbyl moiety.

15. The process of claim 14 wherein the polyhydric phenolic compound is a tris(hydroxy-substituted phenyl) bonded to the same carbon on a $C_1$-$C_6$ moiety.

16. The process of claim 1 wherein the polyhydric phenolic compound is present in an amount of 5 to 20 wt. % based on the weight of said poly(phenylene ether).

17. The process of claim 1 wherein the redistribution catalyst comprises a peroxide or a quinone compound.

18. The process of claim 17 wherein the redistribution catalyst comprises a diphenoquinone compound.

19. The process of claim 17 wherein the peroxide has the formula $$A^3\text{-O—O-}A^3$$

wherein $A^3$ is independently hydrogen, $C_1$-$C_{24}$ alkyl, $C_6$-$C_{24}$ aryl, $C_6$-$C_{24}$ aroyl, $C_1$-$C_{24}$ alkanoyl, $C_1$-$C_{24}$ alkenyl, $C_2$-$C_{24}$ alkoxycarbonyl, sulfuryl, sulfonyl, or phosphoryl.

20. The process of claim 1 further comprising reacting the redistributed poly(phenylene ether) in the reactive monomer diluent with a capping agent to obtain a functionalized poly(phenylene ether) in the reactive monomer diluent, in which unsaturated groups are bonded to the redistributed poly(phenylene ether).

21. The process of claim 20 wherein the functionalized poly(phenylene ether) in the reactive monomer diluent has a functionality, with respect to unsaturated groups, that is greater than 1.

22. The process of claim 21 wherein the functionalized poly(phenylene ether) is a capped poly(phenylene ether) having, on average, 2 or 3 methacryloyl functional end groups.

23. The process of claim 21 wherein over 90% of the hydroxy groups in the redistributed poly(phenylene ether) have been capped with an unsaturated group.

24. The process of claim 20 wherein the functionalized poly(phenylene ether) comprises a capped poly(phenylene ether) having the formula wherein each occurrence of $Q^1$ and $Q^2$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^3$ and $Q^4$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of x and y is independently 0 to about 100 with the proviso that the sum of x and y is 2 to about 100; each occurrence of $R^1$ is independently $C_1$-$C_{12}$ hydrocarbylene; each occurrence of n is independently 0 or 1; each occurrence of $R^2$-$R^4$ is independently hydrogen or $C_1$-$C_{18}$ hydrocarbyl; and L has the formula $$\text{—O-}A^1\text{-Y-}A^2\text{-O—}$$

wherein $A^1$ and $A^2$ are independently a monocyclic divalent a $C_6$-$C_{16}$ aromatic radical, and Y is a single bond, an oxygen, or a $C_1$-$C_{16}$ bridging radical in which one or two atoms separate $A^1$ from $A^2$.

25. The process of claim 24 wherein L is of the formula

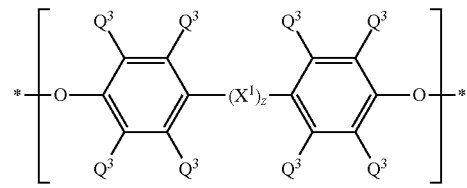

wherein each occurrence of $Q^3$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and $X^1$ has the formula

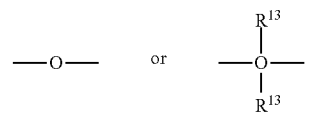

wherein each $R^{13}$ is independently hydrogen, substituted or unsubstituted $C_1$-$C_{12}$ hydrocarbyl, or $C_1$-$C_6$ hydrocarbylene wherein two $R^{13}$ groups collectively form a $C_4$-$C_{12}$ alkylene.

26. The process of claim 25 wherein the functional poly(phenylene ether) comprises a capped poly(phenylene ether) having the formula

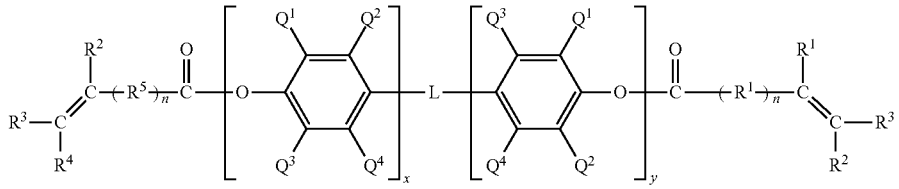

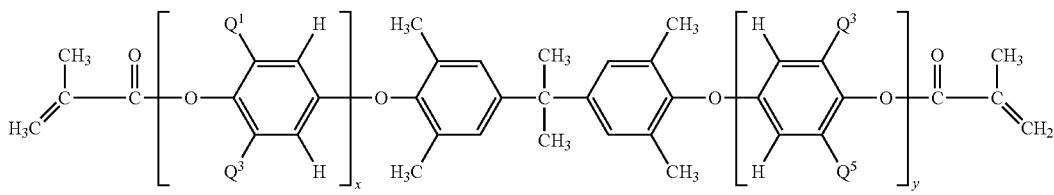

wherein each occurrence of $Q^5$ and $Q^6$ is independently methyl or di-n-butylaminomethyl; and each occurrence of x and y is independently 0 to about 100 with the proviso that the sum of x and y is 2 to about 100.

27. The process of claim 20 further comprising mixing a first composition comprising the functionalized poly(phenylene ether) in the reactive monomer diluent with a second composition comprising an unsaturated resin to obtain a blended curable composition.

28. The process of claim 27 further comprising mixing the blended curable composition with a crosslinking agent.

29. The process of claim 27 wherein the ratio of the total amount of functionalized poly(phenylene ether) and unsaturated resin to reactive monomer diluent is about 2:1 to about 1:5 by weight.

30. The process of claim 27 wherein the unsaturated resin in the second composition comprises unsaturated polyester resin or vinyl ester resin or both unsaturated polyester resin and vinyl ester resin.

31. The process of claim 30 wherein vinyl ester resin is present that is the reaction product of a bisphenol, an epoxy, and a monocarboxylic acid.

32. The process of claim 30 wherein unsaturated polyester resin is present and is obtained by reaction of at least one polyhydric alcohol with at least one polybasic acid comprising an unsaturated polybasic acid, wherein the unsaturated polybasic acid is selected from the group consisting of maleic acid, fumaric acid, itaconic acid, citraconic acid, chloromaleic acid, dimeric methacrylic acid, nadic acid, tetrahydrophthalic acid, endo-methylenetetrahydrophthalic acid, hexachloro-endo-methylenetetrahydrophthalic acid, halogenated phthalic acids, and their esters and anhydrides, and combinations thereof.

33. The process of claim 32 wherein the unsaturated polyester resin comprises repeat units derived from a monomer selected from the group consisting of succinic acid, adipic acid, sebacic acid, azelaic acid, dodecanedioic acid, eicoic acid, phthalic acid, isophthalic acid, terephthalic acid, and their esters and anhydrides, and combinations thereof.

34. The process of claim 32 wherein the polyhydric alcohol is selected from the group consisting of ethylene glycol, propylene glycol, diethylene glycol, dipropylene glycol, 1,2-butanediol, 1,3-butanediol, 1,4-butanediol, neopentyl glycol, glycerol, triethylene glycol, pentanediol, hexylene glycol, bisphenol A, hydrogenated bisphenol A, bisphenol A-alkylene oxide adducts, and tetrabromobisphenol alkylene oxide adducts, and combinations thereof.

35. A process for preparing a redistributed poly(phenylene ether), comprising:
reacting a poly(phenylene ether) in a reactive monomer diluent with a polyhydric phenolic compound in the presence of a redistribution catalyst to form a composition comprising redistributed poly(phenylene ether) in the reactive monomer diluent;
wherein the reactive monomer diluent is selected from the group consisting of vinyl toluene, styrene, butyl styrenes, dibromostyrenes, α-methyl styrene, p-methyl styrene, and combinations thereof; and substantially no organic solvent other than reactive monomer diluent is present during reaction;
wherein the poly(phenylene ether) before redistribution has an intrinsic viscosity of 0.12 to 0.4 deciliter per gram, measured in chloroform at 25° C., and a functionality of 1; and
wherein the redistributed poly(phenylene ether) has an intrinsic viscosity of 0.06 to 0.25 deciliter per gram, measured in chloroform at 25° C., that is 0.1 to 0.34 deciliter per gram lower than the intrinsic viscosity of the poly(phenylene ether) before redistribution.

36. A process for preparing a redistributed poly(phenylene ether), comprising:
reacting a poly(phenylene ether) in a reactive monomer diluent with a polyhydric phenolic compound in the presence of a redistribution catalyst to form a composition comprising a redistributed poly(phenylene ether) in the reactive monomer diluent;
wherein the poly(phenylene ether) is provided in an amount of 20 to 60 wt. %, based on the combined amounts of the poly(phenylene ether), the reactive monomer diluent, the polyhydric phenolic compound, and the redistribution catalyst; the poly(phenylene ether) has an intrinsic viscosity of 0.12 to 0.4 deciliter per gram, measured in chloroform at 25° C., and a functionality of 1; and the poly(phenylene ether) is the polymerization product of at least one monohydric phenol having the formula

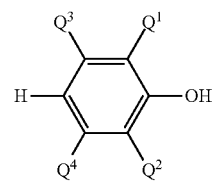

wherein each $Q^1$ and $Q^2$ is independently halogen, unsubstituted or substituted $C_1$-$C_{12}$ hydrocarbyl with the proviso that the hydrocarbyl group is free of a tertiary alpha-carbon, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Q^3$ and $Q^4$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms;
wherein the polyhydric phenolic compound is provided in an amount of 50 to 20 wt. %, based on the weight of the poly(phenylene ether); the polyhydric phenolic compound is either a compound comprising three hydroxy-substituted aromatic moieties bonded to a $C_1$-$C_{12}$ central moiety or a compound having the formula $$HO\text{-}A^1\text{-}Y\text{-}A^2\text{-}OH$$

wherein $A^1$ and $A^2$ are independently a monocyclic divalent $C_6$-$C_{16}$ aromatic radical, and Y is a single bond, an oxygen, or a $C_1$-$C_{16}$ bridging radical in which one or two atoms separate $A^1$ from $A^2$;

wherein the redistribution catalyst is provided in an amount of 0.1 to 10 wt. %, based on the weight of the poly(phenylene ether); and the redistribution catalyst is a peroxide or a quinone compound;

wherein the reactive monomer diluent is provided in an amount of 36 to 79 wt. %, based on the combined amounts of the poly(phenylene ether), the reactive monomer diluent, the polyhydric phenol compound, and the redistribution catalyst; the reactive monomer diluent is selected from the group consisting of vinyl toluene, styrene, butyl styrenes, dibromostyrenes, α-methyl styrene, p-methyl styrene, and combinations thereof; and substantially no organic solvent other than reactive monomer diluent is present during reaction;

wherein the reaction is carried out at a temperature of 70 to 95° C. for 1 to 5 hours; and wherein the redistributed poly(phenylene ether) has the formula:

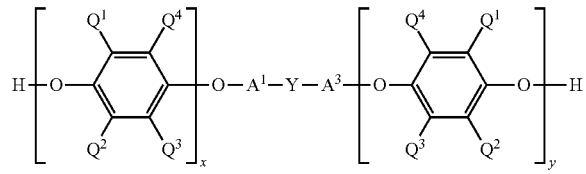

wherein $Q^1$, $Q^2$, $Q^3$, $Q^4$, $A^1$, $A^2$, and Y are as previously defined, x is 0 or a positive number and y is a positive number, and x+y has a value of 2 to about 100, wherein the hydroxy functionality is greater than one.

37. The process of claim 36 further comprising reacting the redistributed poly(phenylene ether) in the reactive monomer diluent with a capping agent to obtain a functionalized poly(phenylene ether) in the reactive monomer diluent, in which unsaturated groups are bonded to the redistributed poly(phenylene ether); wherein greater than 90% of hydroxy groups in the redistributed poly(phenylene ether) are capped with unsaturated groups; and wherein the reactive monomer diluent that was present during the reaction producing the redistributed poly(phenylene ether) remains substantially present during the capping reaction.

38. The process of claim 37, further comprising mixing a first composition comprising the functionalized poly(phenylene ether) in the reactive monomer diluent, a second composition comprising an unsaturated polyester resin, a vinyl ester resin, or both, and a crosslinking agent, to obtain a blended curable composition comprising:

10 to 45 weight percent, based on the total weight of the curable composition, of the functionalized poly(phenylene ether), the functionalized poly(phenylene ether) having the formula

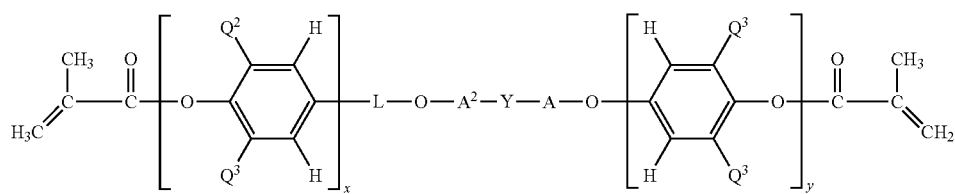

wherein each occurrence of $Q^5$ and $Q^6$ is independently methyl or di-n-butylaminomethyl, wherein each of $A^1$ and $A^2$ is independently a monocyclic divalent aromatic radical and Y is a single bond, an oxygen, or a $C_1$-$C_{16}$ bridging radical in which one or two atoms separate $A^1$ from $A^2$, wherein each occurrence of x and y is independently 0 to about 100 with the proviso that the sum of x and y is 2 to about 100, wherein over 90 percent of the hydroxy groups in the redistributed poly(phenylene ether) are capped;

30 to 50 weight percent, based on the total weight of the curable composition, of the unsaturated polyester resin, the vinyl ester resin, or both the polyester resin and the vinyl ester resin;

20 to 59 weight percent, based on the total weight of the curable composition, of the reactive monomer diluent selected from the group consisting of vinyl toluene, styrene, butyl styrenes, dibromostyrenes, α-methyl styrene, p-methyl styrene, and combinations thereof; and substantially no organic solvent other than the reactive monomer diluent is present; and 1 to 30 weight percent, based on the total weight of the curable composition, of the crosslinking agent, wherein the crosslinking agent is a multifunctional acrylate crosslinking agent.

* * * * *